(12) United States Patent
Asterjadhi et al.

(10) Patent No.: US 10,433,252 B2
(45) Date of Patent: Oct. 1, 2019

(54) OPTIMIZING TARGET WAKE-UP TIME (TWT) OPERATION

(71) Applicant: QUALCOMM Incorporated, San Diego, CA (US)

(72) Inventors: Alfred Asterjadhi, San Diego, CA (US); Abhishek Pramod Patil, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/791,080

(22) Filed: Oct. 23, 2017

(65) Prior Publication Data

US 2018/0115950 A1 Apr. 26, 2018

Related U.S. Application Data

(60) Provisional application No. 62/412,266, filed on Oct. 24, 2016.

(51) Int. Cl.
| | |
|---|---|
| *H04W 52/02* | (2009.01) |
| *H04W 72/12* | (2009.01) |
| *H04W 76/28* | (2018.01) |
| *H04W 28/12* | (2009.01) |
| *H04W 74/08* | (2009.01) |
| *H04W 84/12* | (2009.01) |
| *H04W 74/00* | (2009.01) |
| *H04W 40/00* | (2009.01) |

(52) U.S. Cl.
CPC ... *H04W 52/0219* (2013.01); *H04W 52/0216* (2013.01); *H04W 72/121* (2013.01); *H04W 76/28* (2018.02); *H04W 28/12* (2013.01); *H04W 40/005* (2013.01); *H04W 74/006* (2013.01); *H04W 74/0816* (2013.01); *H04W 84/12* (2013.01); *Y02D 70/00* (2018.01); *Y02D 70/1262* (2018.01); *Y02D 70/142* (2018.01); *Y02D 70/164* (2018.01)

(58) Field of Classification Search
None
See application file for complete search history.

(56) References Cited

U.S. PATENT DOCUMENTS

| | | | |
|---|---|---|---|
| 2014/0133376 A1* | 5/2014 | Ghosh | H04W 52/0216 370/311 |
| 2014/0133393 A1* | 5/2014 | Ghosh | H04W 8/26 370/328 |
| 2014/0334365 A1* | 11/2014 | Jafarian | H04W 52/0225 370/311 |

(Continued)

OTHER PUBLICATIONS

Fischer M., (BROADCOM): "LB203 twt behavior 9-42a; 11-14-1140-00-00ah-lb203-twt-behavior-9-42a", IEEE Draft; IEEE-SA Mentor, Piscataway, NJ USA, vol. 802. 11ah, Sep. 16, 2014, pp. 1-23, XP068070934, [retrieved on Sep. 16, 2014].

(Continued)

*Primary Examiner* — Otis L Thompson, Jr.
(74) *Attorney, Agent, or Firm* — Patterson & Sheridan, L.L.P.

(57) ABSTRACT

Certain aspects of the present disclosure generally relate to wireless communications and, more particularly, to techniques that may help optimize scheduling target wake-up times (TWTs) of wireless nodes.

19 Claims, 6 Drawing Sheets

(56) References Cited

U.S. PATENT DOCUMENTS

| | | | |
|---|---|---|---|
| 2016/0100361 A1* | 4/2016 | Zheng | H04W 52/0216 |
| | | | 455/522 |
| 2016/0135199 A1* | 5/2016 | Wang | H04W 74/0816 |
| | | | 455/450 |
| 2016/0219512 A1 | 7/2016 | Asterjadhi et al. | |
| 2016/0249383 A1* | 8/2016 | Kwon | H04W 72/04 |
| 2016/0381704 A1* | 12/2016 | Chu | H04W 74/04 |
| | | | 370/329 |
| 2018/0302930 A1* | 10/2018 | Wang | H04W 76/10 |

OTHER PUBLICATIONS

Fischer M., (BROADCOM): "HLB200-clause-9_41; 11-14-0396-03-00ah-1b200-clause-9-41", IEEE Draft; 11-14-0396-03-00AH-LB200-Clause-9-41, IEEE-SA Mentor, Piscataway, NJ USA, Mar. 20, 2014 (Mar. 20, 2014), vol. 802.11ah, No. 3, pp. 1-43, XP068069075, [retrieved on Mar. 20, 2014].

International Search Report and Written Opinion—PCT/US2017/058033—ISA/EPO—dated Jan. 22, 2018.

Stacey R., (INTEL): "Proposed Draft Specification; 11-16-0024-01-00ax-proposed-draft-specification", vol. 802.11 ax, No. 1, Mar. 3, 2016, XP068104773, pp. 1-160.

* cited by examiner

OPTIMIZING TARGET WAKE-UP TIME (TWT) OPERATION

CLAIM OF PRIORITY UNDER 35 U.S.C. § 119

The present application for patent claims benefit of U.S. Provisional Patent Application Ser. No. 62/412,266, filed Oct. 24, 2016, assigned to the assignee hereof and hereby expressly incorporated by reference herein.

BACKGROUND

Field of the Disclosure

Certain aspects of the present disclosure generally relate to wireless communications and, more particularly, to coordinating target wake-up times (TWTs) of different wireless nodes and indicating, during TWT service periods, which wireless nodes are to be serviced.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various techniques are being developed. One such technique is to utilize a WLAN, such as an Institute of Electrical and Electronics Engineers (IEEE) 802.11ah wireless network, for some communications to a device, and a WWAN, such as a long term evolution (LTE) network for other communications to a device. Have a device monitor for paging messages in one or more WLANs and a WWAN may cause the device to consume more power than the device would use in monitoring for paging messages in only one network (e.g., with receive circuitry kept on longer during awake times causing more power consumption). Thus, there is a desire to develop techniques for a device to conserve power while monitoring for paging messages in one or more WLANs and a WWAN.

SUMMARY

Certain aspects of the present disclosure provide an apparatus for wireless communications. The apparatus generally includes a processing system configured to generate one or more first frames that, collectively, include a set of parameters defining at least one broadcast target wake-up time (TWT) schedule and an assignment of one or more wireless nodes to one or more TWT groups to be serviced in different TWT service periods (SPs) associated with the at least one broadcast TWT schedule and a first interface configured to output the one or more first frames for transmission.

Certain aspects of the present disclosure provide an apparatus for wireless communications. The apparatus generally includes a first interface configured to obtain one or more first frames from a wireless node that collectively, include a set of parameters defining at least one broadcast target wake-up time (TWT) schedule and an assignment of the apparatus to at least one TWT group to be serviced in TWT service periods (SPs) associated with the at least one broadcast TWT schedule and a processing system configured to cause the apparatus to exit a first state (e.g., a reduced power/inactive state) before or during a TWT SP, based on the broadcast TWT schedule and the assignment.

Aspects of the present disclosure also provide various methods, means, and computer program products corresponding to the apparatuses and operations described above.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
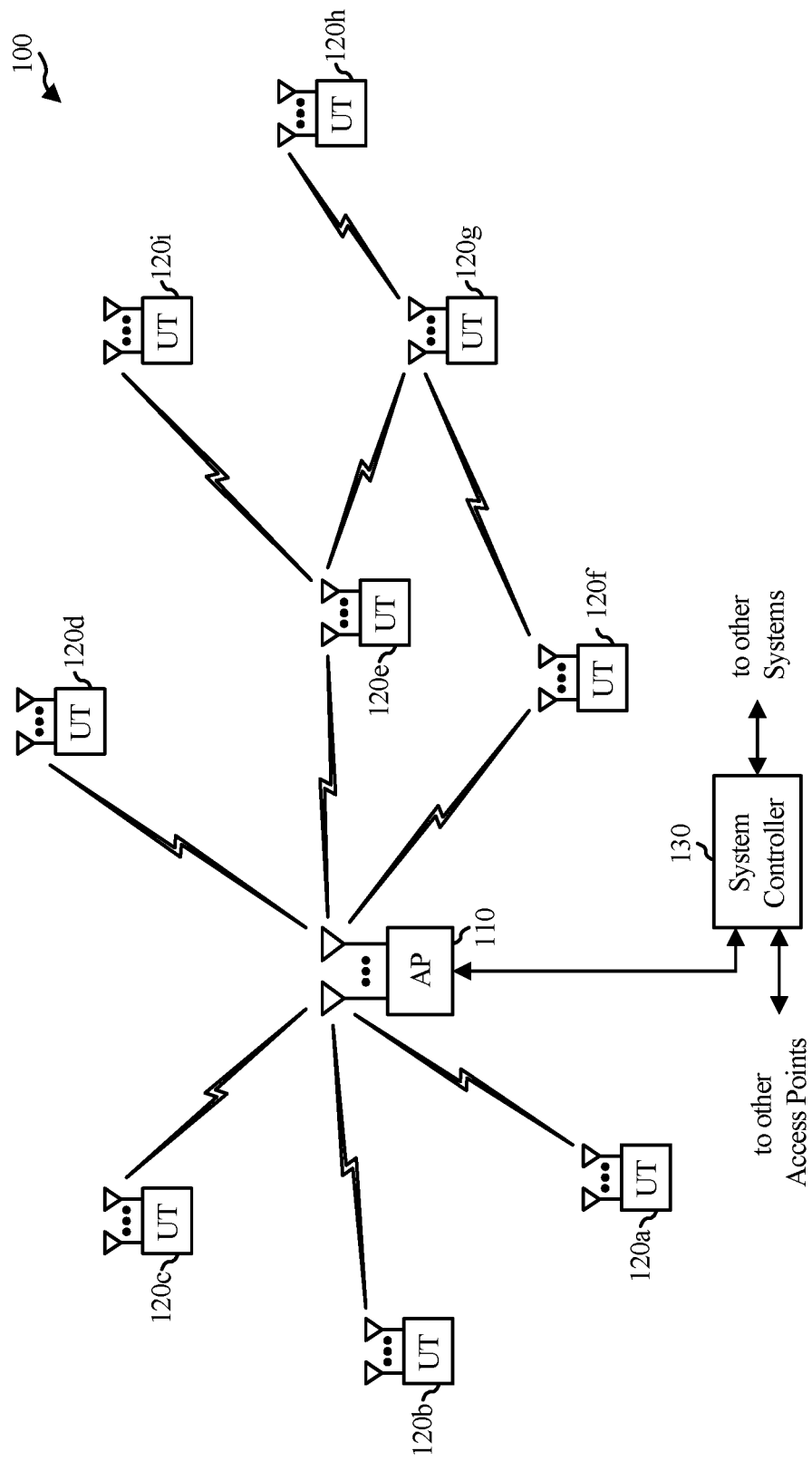
FIG. 1 illustrates a diagram of an example wireless communications network, in accordance with certain aspects of the present disclosure.

A station (STA) operating according to the IEEE 802.11ah wireless networking standard may enter a low-power state (e.g., a deep-sleep mode), wherein the STA powers off one or more components, including receiver components, and does not transmit or receive until the STA wakes up. Such a STA may associate to an access point (AP) of a WLAN and be configured to wake periodically to listen for paging messages from the AP and/or transmit data to the AP. When the STA is preparing to enter the low-power state, the STA and the AP may negotiate a target wake time (TWT) when the STA will wake up. The TWT may occur periodically. By negotiating the TWT, the STA is configured to wake up periodically and listen for paging messages, and the AP is configured with times to page the STA, if the AP has data to send to the STA. If data for the STA arrives at the AP while the STA is in the low-power state, the AP may buffer the data until the next TWT has occurred, and then send a paging message to the STA to notify the STA that the STA may exit the low-power state (e.g., wake up by exiting a low-power, inactive, or otherwise unavailable state). After the STA has exited the low-power state, the AP may transmit the buffered data to the STA.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure described herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals in which aspects of the present disclosure may be practiced. For example, one or more user terminals 120 may signal capabilities (e.g., to access point 110) using the techniques provided herein.

For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The access point 110 and user terminals 120 employ multiple transmit and multiple receive antennas for data transmission on the downlink and uplink. For downlink MIMO transmissions, $N_{ap}$ antennas of the access point 110 represent the multiple-input (MI) portion of MIMO, while a set of K user terminals represent the multiple-output (MO) portion of MIMO. Conversely, for uplink MIMO transmissions, the set of K user terminals represent the MI portion, while the $N_{ap}$ antennas of the access point 110 represent the MO portion. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals may have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
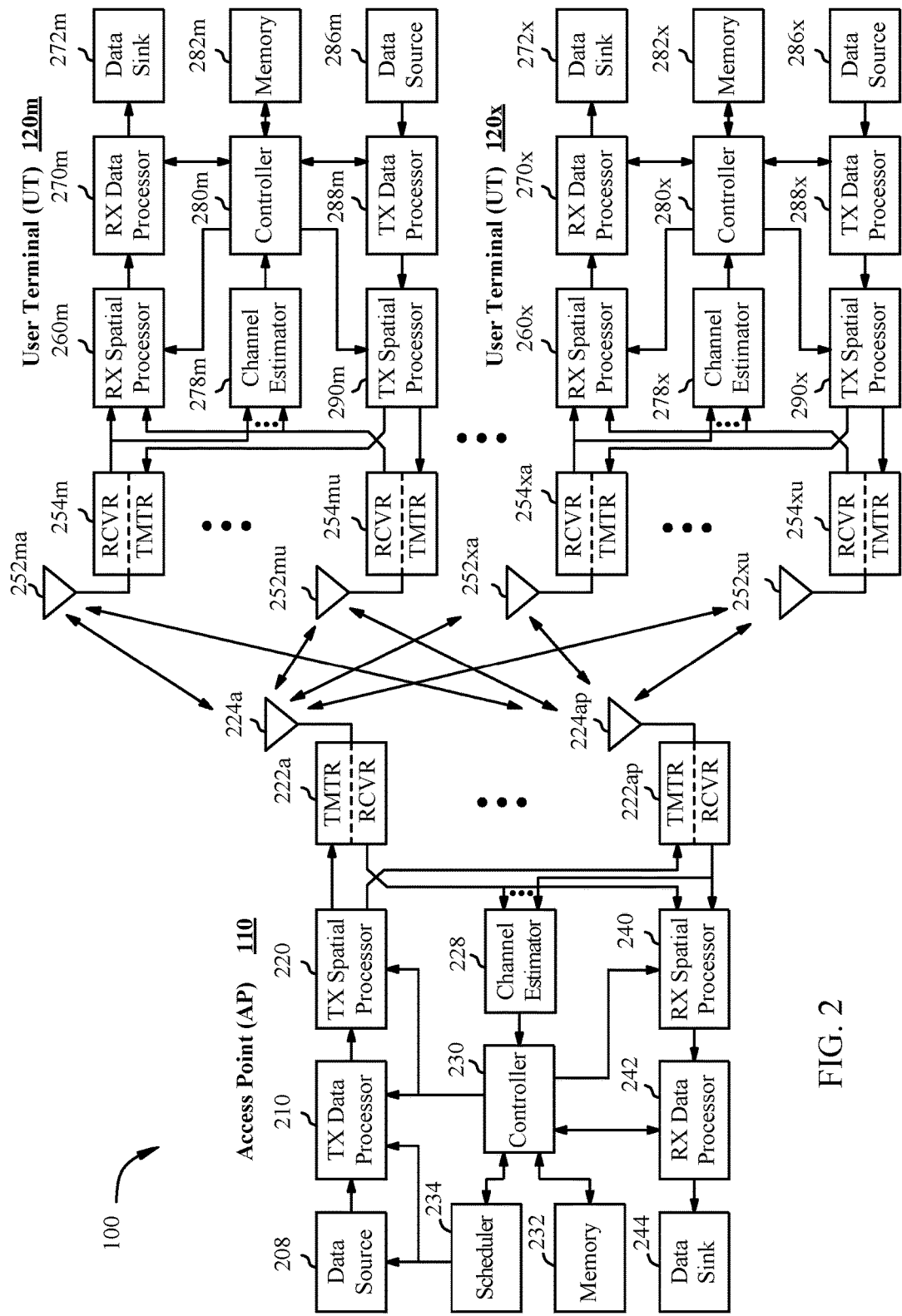
FIG. 2 illustrates a block diagram of an example access point (AP) and user terminals (UTs), in accordance with certain aspects of the present disclosure.

FIG. 2 illustrates a block diagram of access point 110 and two user terminals 120m and 120x in MIMO system 100 that may be examples of the access point 110 and user terminals 120 described above with reference to FIG. 1 and capable of performing the techniques described herein. The various processors shown in FIG. 2 may be configured to perform (or direct a device to perform) various methods described herein, for example, the operations 400 and 500 described in association with FIGS. 4 and 5.

The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink. For SDMA transmissions, $N_{up}$ user terminals simultaneously transmit on the uplink, while $N_{dn}$ user terminals are simultaneously transmitted to on the downlink by the access point 110. $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal (e.g., the transmitter unit or corresponding circuitry may perform generation of the uplink signal). $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas.

Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal. The decoded data for each user terminal may be provided to a data sink 272 for storage and/or a controller 280 for further processing.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
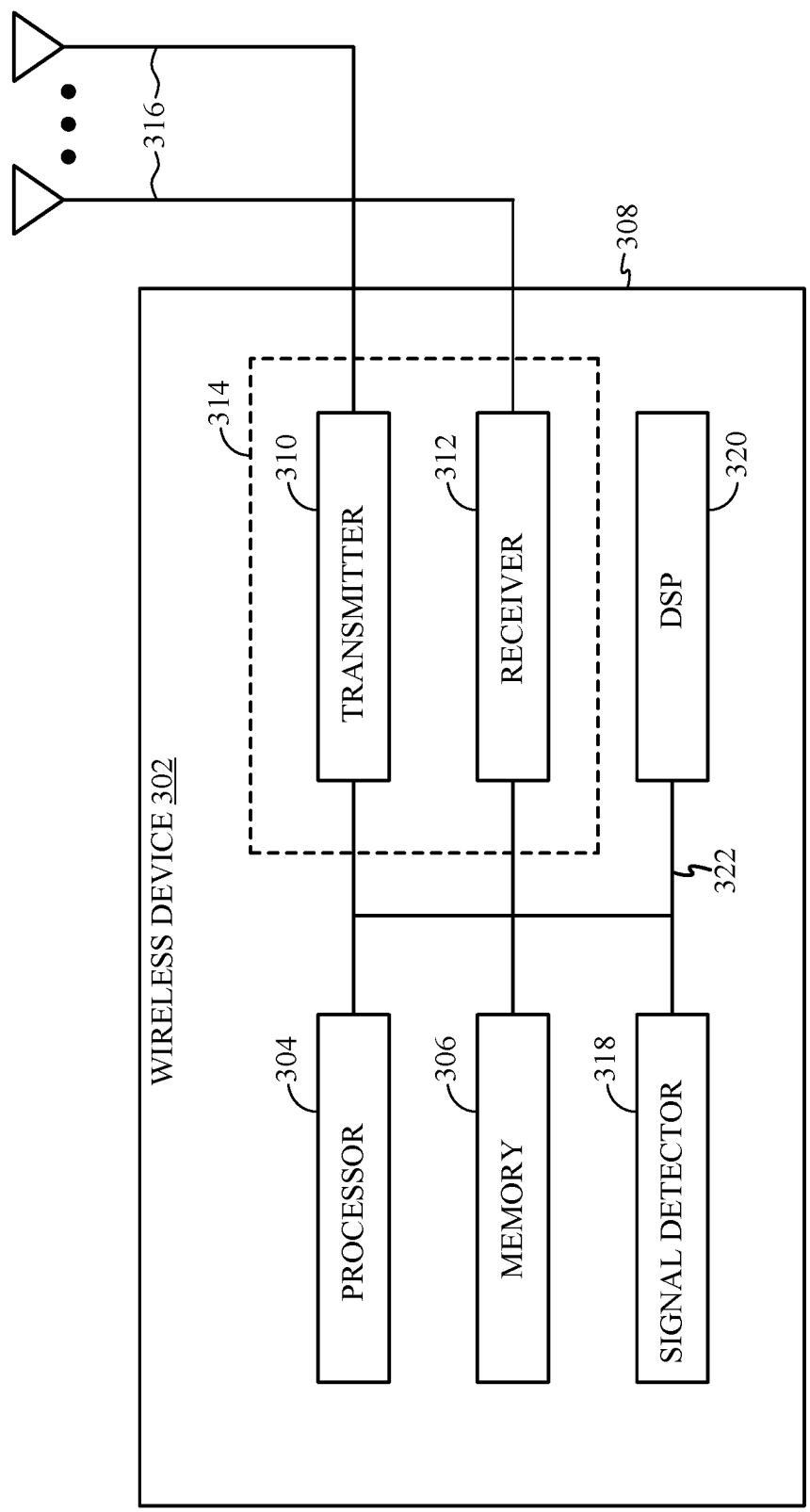
FIG. 3 illustrates a block diagram of an example wireless node, in accordance with certain aspects of the present disclosure.

FIG. 3 illustrates example components that may be utilized in AP 110 and/or UT 120 to implement aspects of the present disclosure. For example, the transmitter 310, antenna(s) 316, processor 304, and/or DSP 320 may be used to practice aspects of the present disclosure implemented by an AP or UT, such as operation 400 described in association with FIG. 4 below. Further, the receiver 312, antenna(s) 316, processor 304, and/or the DSP 320 may be used to practice aspects of the present disclosure implemented by an AP or UT, such as operation 500 described in association with FIG. 5. The wireless node (e.g., wireless device) 302 may be an access point 110 or a user terminal 120.

The wireless node (e.g., wireless device) 302 may include a processor 304 which controls operation of the wireless node 302. The processor 304 may also be referred to as a central processing unit (CPU). The processor 304 may control the wireless node 302 in executing the various methods described herein, for example, the operations 400 and 500 described in association with FIGS. 4 and 5. Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein, for example, the operations 400 and 500 described in association with FIGS. 4 and 5.

The wireless node 302 may also include a housing 308 that may include a transmitter 310 and a receiver 312 to allow transmission and reception of data between the wireless node 302 and a remote node. The transmitter 310 and receiver 312 may be combined into a transceiver 314. A single transmit antenna or a plurality of transmit antennas 316 may be attached to the housing 308 and electrically coupled to the transceiver 314. The wireless node 302 may also include (not shown) multiple transmitters, multiple receivers, and multiple transceivers.

The wireless node 302 may use multiple transmitters, multiple receivers, and/or multiple transceivers in communicating with a WWAN and one or more WLANs. Additionally or alternatively, the wireless node 302 may communicate with a WWAN via a single transmitter 310, a single receiver 312, and/or a single transceiver 314 and retune the transmitter 310, receiver 312, and/or transceiver 314 (tune away from the WWAN) to communicate with one or more WLANs.

The wireless node 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless node 302 may also include a digital signal processor (DSP) 320 for use in processing signals.

The various components of the wireless node 302 may be coupled together by a bus system 322, which may include a power bus, a control signal bus, and a status signal bus in addition to a data bus.

In general, an AP and STA may perform similar (e.g., symmetric or complementary) operations. Therefore, for many of the techniques described herein, an AP or STA may perform similar operations. To that end, the following description will sometimes refer to an "AP/STA" to reflect that an operation may be performed by either. Although, it should be understood that even if only "AP" or "STA" is used, it does not mean a corresponding operation or mechanism is limited to that type of device.

Example Coordination of Receiver Wake-Up Times Used for WWANs and WLANs

As described above, a station (STA) operating in one type of network according to one standard (e.g., the IEEE 802.11 ah wireless networking standard) may enter a low-power state (e.g., a deep-sleep mode). In such a state, the STA may power off one or more components, including receiver components, and may not transmit or receive until the STA exits the low-power state (wakes up).

In some cases, such a STA may negotiate with another STA (for example, a non-AP STA may negotiate with an AP) for a target wake time (TWT) that indicates when the STA will wake up. In some cases, timing of the (next) TWT may be indicated (from or to the STA) explicitly every time the STA interacts with the other STA. In other cases, TWTs may occur periodically and the parameters of the TWT schedules (the parameters may be part of a TWT configuration) may be negotiated in advance.

In any case, by negotiating the TWT, the STA is configured to wake up at the scheduled TWTs and may either listen for paging messages sent by the AP or may transmit a polling frame to the AP. Similarly, the AP may be configured such that the AP transmits one or more paging frame(s) to the STA or is configured to receive a polling frame from the STA at those times. This approach allows the STA to remain in a low power state until those times.

During a frame exchange, the communicating devices (e.g., a STA and AP) may communicate to each other whether they have data to send to each other. In certain embodiments, the STAs exchange other information, such as a request to switch frequency bands and/or communication technologies. When the AP indicates data availability, if data for the STA arrives at the AP while the STA is in the low-power state, the AP may buffer the data until the next TWT. During the next TWT, the AP may then send a paging message to the STA to notify the STA that the STA may exit the low-power state (e.g., wake up). After the STA has exited the low-power state, the AP may transmit the buffered data to the STA. While this example is related to one STA in particular, one skilled in the art may appreciate that this scheduled procedure may be negotiated and used by and/or with one or more STAs.

According to aspects of the present disclosure, a STA may determine whether the STA is in range of a second WLAN (e.g., an IEEE 802.11ac WLAN) based on a signal strength metric. Examples of such a metric include a reference signal strength indicator (RSSI) of a first WLAN (e.g., an IEEE 802.11ah WLAN). Based on such a metric, the STA may determine to activate a second receiver, transmitter, and/or transceiver to communicate with the second WLAN, for example, if the signal strength metric of the first WLAN is equal to or above a threshold.

According to aspects of the present disclosure, a STA may receive a paging message from a WLAN via a sub-one gigahertz (S1G) beacon. Additionally or alternatively, a STA may receive a paging message via a null data packet (NDP) paging message. An NDP paging message may include an identifier (e.g. a P-ID field that includes a partial association identification (AID) of a STA) or an identifier that is assigned to one or more STAs if the paging AP determines to page multiple STAs.

According to aspects of the present disclosure, a STA may receive paging messages from a WLAN or a traffic indication map (TIM) including information for a plurality of STAs. The paging messages may also indicate whether there is multicast/broadcast traffic buffered at the AP if the paging message is a delivery traffic indication map (DTIM), which may be indicated by bit 0 of the TIM being 1.

Example TWT Scheduling Optimizations

As described above, a Target Wake Time (TWT) generally refers to a scheduling mechanism that allows an AP and one or more STAs to establish times or sets of times for the STAs to access the medium. As described above, the use of TWT is typically negotiated between an AP and a STA and may be used to reduce network energy consumption, as stations can enter a low (reduced) power state (e.g., with one or more receive and/or transmit components powered down) until their TWT arrives.

As such, TWTs may provide an efficient approach for various cases, such as where STAs have periodic traffic. In dense deployment scenarios, however, a STA may sometimes wait long periods of time before the STA is serviced by the AP. This wait may lead to poor power savings at the STA, due to unnecessary wake-ups, and ineffective utilization of TWT operation.

In general, the AP typically has better knowledge of surroundings and congestion within its own BSS. Therefore, it may be beneficial for the AP to signal and schedule STAs in an on-demand fashion, in an effort to ensure efficient use of TWT SP and effective power save at STAs.

Aspects of the present disclosure provide techniques that may help enhance TWT operation. For example, in some cases, an AP and STA may establish a particular TWT schedule, based on TWT groups selected in a particular manner. In some cases, one or more frames may indicate a range of association identifications (AIDs) and/or broadcast TWT identification that define one or more TWT groups. In other cases, TWT groups may include different TWT groups to be serviced in different repeating intervals of the broadcast TWT schedule.

Figure 4:
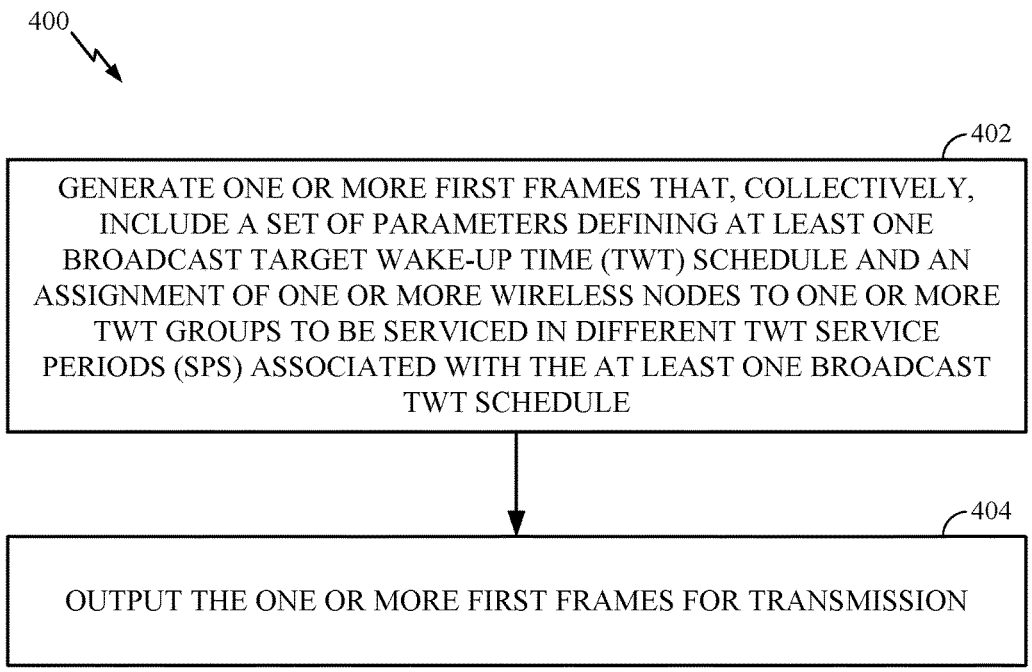
FIG. 4 sets forth example operations for wireless communications by an access point, in accordance with certain aspects of the present disclosure.

FIG. 4 illustrates example operations 400 that may be performed by an apparatus, such as an access point (AP), in accordance with aspects of the present disclosure.

Operations 400 begin, at 402, by generating one or more first frames that, collectively, include a set of parameters defining at least one broadcast target wake-up time (TWT) schedule and an assignment of one or more wireless nodes to one or more TWT groups to be serviced in different TWT service periods (SPs) associated with the at least one broadcast TWT schedule. At 404, the AP outputs the one or more first frames for transmission.

Figure 5:
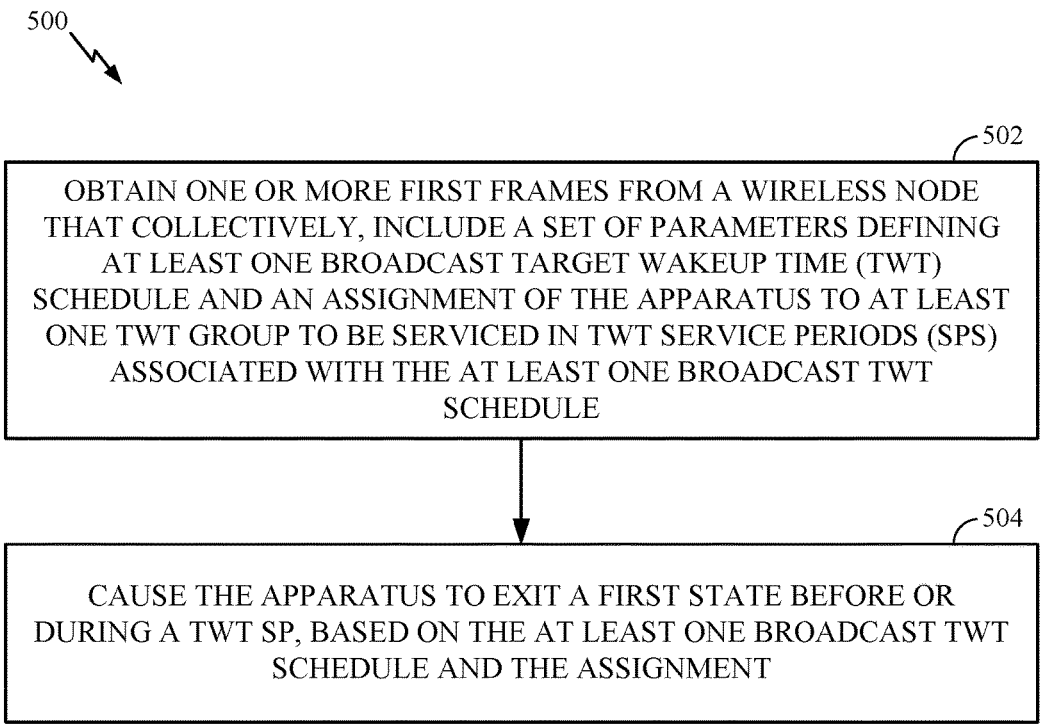
FIG. 5 sets forth example operations for wireless communications by a wireless station, in accordance with certain aspects of the present disclosure.

FIG. 5 illustrates example operations 500 that may be performed by a wireless node, such as a STA, in accordance with aspects of the present disclosure. Operations 500 may be considered STA-side claims that are complementary to operations 400. In other words, operations 500 may be performed by a STA served by an AP performing operations 400 described above.

Operations 500 begin, at 502, by obtaining one or more first frames from a wireless node that, collectively, include a set of parameters defining at least one broadcast target wake-up time (TWT) schedule and an assignment of the apparatus to at least one TWT group to be serviced in TWT service periods (SPs) associated with the at least one broadcast TWT schedule. At 504, the apparatus exits a first state (e.g., a reduced power/inactive state) before or during a TWT SP, based on the at least one broadcast TWT schedule and the assignment.

In some cases, during each TWT service period (SP), an AP may indicate which STAs will be serviced (or not serviced), which may allow STAs that are not being serviced to re-enter or return to a low power (or otherwise unavailable) state or some other state where the STAs are not available (e.g., STAs re-entering a low power state). The techniques described herein generally allow a STA to know if it is to be serviced in a TWT SP so it may know whether to remain available or otherwise return to an unavailable state during the TWT SP. The unavailable state may be a low power state or some other state that renders the STA effectively unavailable, such as tuning away to participate in some other network. Thus, the terms wake-up or wake-up schedule may generally refer to when a STA becomes available, regardless of the reason.

According to certain aspects, an AP may setup one or more broadcast TWT schedules. Such schedules may be considered "non-negotiated" and provide for TWT service periods (SPs) that are somewhat independent of TWT requests. In some cases, broadcast TWT schedules may be limited to STAs that do not have an individual TWT negotiated, but support broadcast TWT SPs.

Aspects of the present disclosure provide various ways to group stations (into TWT groups) to be serviced in a same TWT SP. For example, during association, an AP may inform a STA of a TWT Group ID that the STA is assigned to. As another example, the AP may inform the STA of the TWT Group ID after a TWT schedule is announced.

In some cases, the AP may learn STA wake-up (or more generally availability) schedules and assign (or re-assign) STAs to an appropriate group (after learning the schedules). For example, an AP may attempt to align TWT SPs of a given group to the wake-up schedules of STAs in that group. In some cases, an AP may learn the preferred wake-up schedules, for example, based on a detected presence of the wireless nodes during previous TWT SPs.

In some cases, after an AP has advertised broadcast TWT schedule(s), STAs may pick a group ID based on their preferred wake-up schedule. In some case, the AP advertises a single TWT schedule and assigns group IDs that correspond to different repeating intervals of the schedule. For example, if a TWT schedule repeats every 20 ms, a first group may have a TWT schedule of 20 ms (G1=20 ms frequency), while a second group may have a TWT schedule of 40 ms (G2 indicates 40 ms frequency), while a third group has a TWT schedule of 60 ms (e.g., G3 indicates 60 ms frequency). In some cases, a STA may pick one or more groups with TWT schedules that closely align with its wake-up schedule.

In some cases, an AP may obtain a second frame that indicates a preferred wake-up schedule of a STA. In such cases, the AP may assign that STA to a TWT group based on the preferred wake-up schedule. The second frame may be obtained, for example, after the first frames are output for transmission or during an association procedure performed with that STA.

In some cases, the AP may obtain a second frame that indicates a request from a STA (requesting) to change a TWT group assignment or a change to the preferred wake-up time of the STA. In such cases, the AP may assign the STA to a TWT group based on the request or re-assign the STA to another TWT group based on the change to the preferred wake-up schedule.

In some cases, a STA may be able to indicate if the STA prefers picking its own group, whether the STA would like the AP to assign the STA to a particular group, or if the STA has no preference. In some cases, such a preference (or lack thereof) may be indicated during association. In some cases, an AP may only perform a group assignment for STAs that do not support their own mechanism for group selection. In some systems, an AP may have a default TWT SP schedule for STAs that do not have a preference to select their own group (TWT schedule).

In some cases, an AP may inform a STA of the group association identification (AID) and/or a broadcast TWT identification that the STA is assigned to during association. In some cases, a broadcast TWT may indicate (e.g., via a Group AID field) the collection of STAs that have been scheduled for SPs indicated by this TWT. As noted above, the AP may learn the wake-up schedule of a STA and assign/re-assign that STA to an appropriate group. In some cases, a TWT information element (IE) or some other element/field may indicate a range of AIDs (e.g., by including Start AID and End AID fields in the Broadcast TWT IE) for each TWT Parameter Set.

Aspects of the present disclosure also provide various ways for an AP to indicate which stations of a group are to be serviced during a given TWT SP. Which stations of a TWT group that are to be serviced in a particular TWT SP may be separately indicated by a subsequent transmission (e.g., a TIM frame, discovery frame, or trigger frame) during a broadcast TWT that narrows down which STAs of the group are to be serviced.

For example, at the beginning of each broadcast TWT SP (for a TWT group), an AP may transmit a traffic indication map (TIM) frame which carries a list of STAs (as a bitmap) that the AP intends to service during this SP. Such a TIM frame may be the same or similar to a TIM frame defined in a standard. In this case, a STA not listed in the TIM may return to a power save mode during this SP.

In some cases, the beginning of each SP may have a short paging window (PW) during which the AP transmits a TIM frame and a listed STA responds by sending a PS-POLL (or QoS Null) frame to indicate that the STA is present during that SP. STAs that do not reply may be considered not present and an AP may narrow down the STAs serviced during that SP to only those STAs that respond.

In some cases, an indication of stations to be serviced may be provided in a beacon or discovery frame (e.g., a fast initial link setup or "FILS" Discovery frame or FD frame). In some cases, the indication of stations could be carried in some other type of frame, such as a management frame (e.g., an action frame defined to carry the TIM element).

Figure 6:
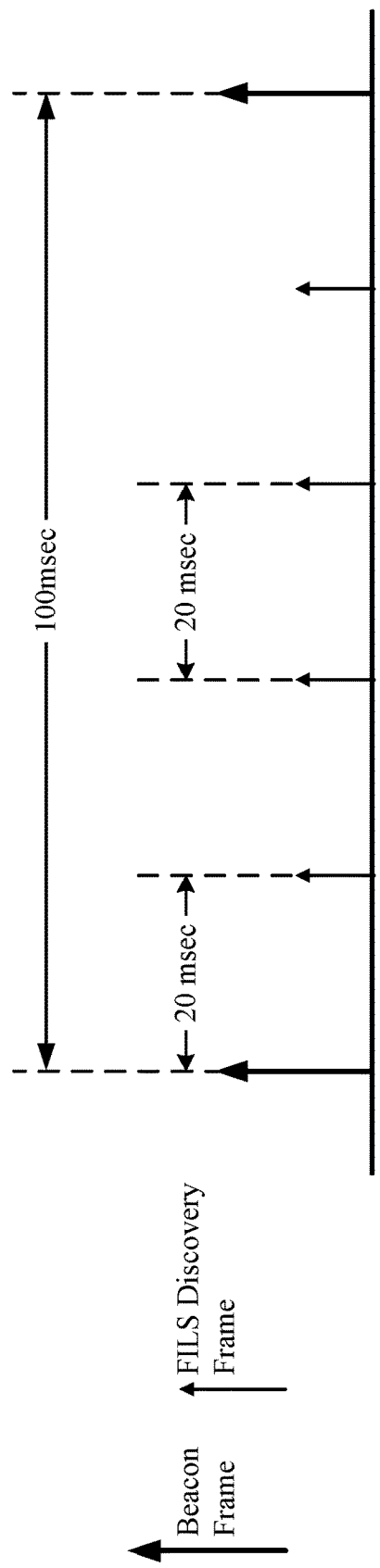
FIG. 6 illustrates an example timing diagram for using beacon frames to indicate wireless nodes to be serviced in a TWT, in accordance with certain aspects of the present disclosure.

As illustrated in FIG. 6, such discover frames may provide a mechanism for an AP to transmit frequent 'short' beacons (or mini beacons) at periodic intervals between two consecutive beacon frames. In the illustrated example, beacon frames may be transmitted with a 100 ms periodicity, with 4 FD frames transmitted between each beacon frame. FD frames generally refer to public action frames that may carry several (optional) elements. Bits in an FD Control subfield may indicate which elements are present in the frame. Thus, FD frames may be as a mechanism for periodic traffic/schedule advertisement.

Such frames may include a TIM element indicating which STAs are to be serviced in an (upcoming) TWT SP. In some case, a reserved bit in a field of FD frames (e.g., an FD Control subfield) to indicate presence of a TIM element. In this way, no additional overhead of transmitting a new frame may be needed to carry a TIM or other schedule indication field. In some cases, non-AP STAs may, thus, check a TIM carried in such Beacon/FD frames to see if the non-AP STAs can return to a low power state (e.g., go to sleep) until the next FD/Beacon frame.

In this manner, each bit in a TIM (virtual) bitmap may correspond to a STA (e.g., within a BSS) that an AP is prepared to schedule or deliver buffered traffic at the time the frame carrying the TIM is transmitted.

In some systems, the TIM bitmap usage may be inversed. In other words, the STAs listed in the TIM may be STAs that will not get scheduled during a particular or upcoming TWT SP or time period.

In some cases, an FD frame may also carry a TWT Information field, for example, to indicate an update or updates to a particular TWT SP (e.t., a TWT SP identified based on the flow identifier). FD frames may also carry a Group ID/Group AID to indicate a subset of STAs that will be addressed (serviced) during the period between the current FD frame and the next FD/Beacon frame.

Some systems may employ what may be considered a "hybrid technique" involving both TIM broadcast and FD frames. In such cases, depending on the alignment of TWT SPs with respect to FD frames, an AP may (decide which STAs to service and) transmit (e.g., after deciding which STAs to service) a TIM broadcast at the beginning of a TWT SP or the AP may transmit an FD frame within or just before the TWT SP to indicate which STA the AP plans to service (or not service) during the upcoming SP.

At the beginning of a TWT period, a trigger frame may indicate a schedule for several STAs. In some cases, STAs to be served in a TWT SP may be signaled in one or more fields used for other purposes. For example, some or all padding fields (added to make a frame format a certain length or to provide enough time for the triggered STAs to prepare their response to the trigger frame in a short (SIFS)

time) may be replaced with AIDs/broadcast TWT identification (or a list of STAs) of the STAs that will not be scheduled during this TWT SP. STAs indicated in the trigger schedule may remain awake and exchange UL/DL frames with the AP. On the other hand, STAs listed in the AID/broadcast TWT identification-padding may transition to a power-save mode for the rest of the SP.

In some cases, a short a paging window (PW) may be defined at the beginning of each TWT SP. In such cases, an AP may send MU QoS Null frame(s) to multiple STAs during the PW to indicate those multiple STAs will be serviced during this SP. In this case, STAs that do not receive a QoS Null frame during the PW may go to sleep for the rest of the SP. An AP may utilize such an MU QoS mechanism outside of a TWT SP to poll STAs that do not support TWT or are not participating in TWT.

In some cases, for example, depending on the type of TWT, STAs may or may not acknowledge (ACK) an AP service announcement (i.e., plan to service certain STAs) to inform the AP that the STAs are present during this SP. In an "announced" scheme, a STA may send an UL transmission to the AP to indicate that the STA is present during that SP. In an "unannounced" scheme, the AP may assume the STA is present and can start servicing the STA without waiting for any explicit indication from the STA.

In some cases, a TWT element may include a field (new or modify an existing one) to assign a group identifier to a particular schedule. The STA that prefers to select its schedule may choose one or more TWT group (i.e., schedule) that aligns with its wake-up schedule. An AP shall assign a group ID to STAs that have not indicated such a preference.

In some systems, each TWT group (schedule) may permit selecting a sub-set of a schedule. For example, a schedule that repeats every 20 ms (e.g., via a group ID=8) may allow assignment such that one STA selects 20 ms wake-up period while another selects a 60 ms wake-up period. This may be achieved via a {group, bin} tuple. In such case, the tuple may look like (8,1) and (8, 3) respectively. Such a scheme may reduce the number of schedules that the AP needs to advertise (i.e., a single TWT schedule can represent several possible wake-up schedules via a group, bin tuple).

In some systems, at the beginning of each TWT service period (SP), a trigger-response may serve as a mechanism for an AP to inform a group of STAs that will be serviced during this interval (SP) and those STAs (via their response) may inform the AP that they are available during this SP. As an example, the AP may send an NDPA to a subset of STAs via a trigger. Only the STAs that are listed in the trigger may remain awake and respond to the AP. The rest of the STAs may go to power save mode. In some cases, a high efficiency (HE) sounding report (i.e., response) from the STAs may provide useful information to the AP and, at the same time, may also let the AP know that this particular STA is present during this SP. The AP may use this mechanism to solicit other kinds of information such as a buffer status report.

Figure 4A:
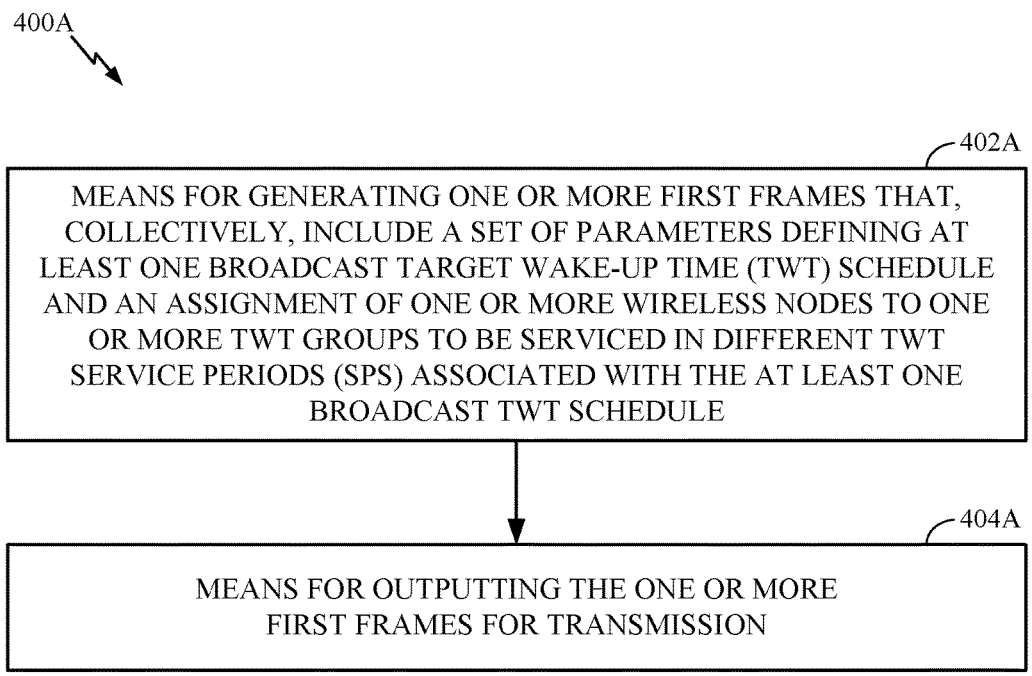
FIG. 4A illustrates example components capable of performing the operations set forth in FIG. 4.
Figure 5A:
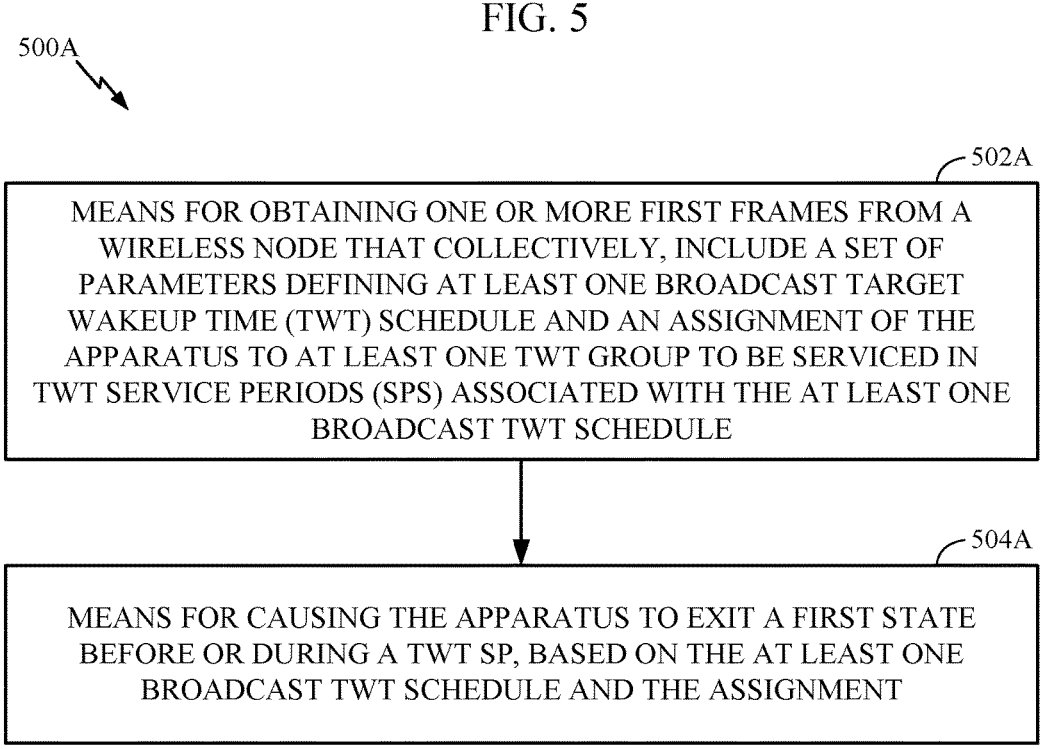
FIG. 5A illustrates example components capable of performing the operations set forth in FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400 and 500 illustrated in FIGS. 4 and 5 correspond to means 400A and 500A illustrated in FIGS. 4A and 5A.

For example, means for transmitting (or means for outputting for transmission) may comprise a transmitter or transceiver (e.g., the transmitter unit 222) and/or an antenna(s) 224 of the access point 110 or the transmitter unit 254 and/or antenna(s) 252 of the user terminal 120 illustrated in FIG. 2. Means for receiving (or means for obtaining) may comprise a receiver or transceiver (e.g., the receiver unit 222) and/or an antenna(s) 224 of the access point 110 or the receiver unit 254 and/or antenna(s) 254 of the user terminal 120 illustrated in FIG. 2. Means for processing, means for obtaining, means for generating, means for selecting, means for decoding, means for causing, means for servicing, means for assigning, means for re-assigning, means for deciding, means for learning, means for re-entering, or means for determining, may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art.

Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    a processing system configured to generate one or more first frames that, collectively, include a set of parameters defining at least one broadcast target wake-up time (TWT) schedule and an assignment of one or more wireless nodes to one or more TWT groups to be serviced in different TWT service periods (SPs) associated with the at least one broadcast TWT schedule wherein the processing system is further configured to generate at least one second frame comprising an indication, for each of the TWT SPs, of one or more wireless nodes of a TWT group to be serviced;
    a first interface configured to output the one or more first frames for transmission, the first interface being further configured to output the at least one second frame for transmission; and
    a second interface configured to obtain at least a third frame from one of the one or more wireless nodes of the TWT group to be serviced, in response to the at least one second frame; and
    wherein the processing system is further configured to service wireless nodes from which third frames are received by the apparatus.

2. The apparatus of claim 1, wherein:
    the generation comprises assigning the one or more wireless nodes to a TWT group corresponding to the broadcast TWT schedule; and
    the one or more first frames include one or more identifications for the TWT group.

3. The apparatus of claim 1, wherein the generation comprises assigning the one or more wireless nodes to the one or more TWT groups, based on one or more preferred wake-up schedules of the one or more wireless nodes, wherein each wake-up schedule indicates availability of a corresponding one of the wireless nodes.

4. The apparatus of claim 3, wherein the processing system is further configured to learn the one or more preferred wake-up schedules of the one or more wireless nodes, based on detected presence of the one or more wireless nodes during previous TWT SPs.

5. The apparatus of claim 3, further comprising:
    at least a second interface configured to obtain at least a second frame indicating the preferred wake-up schedule of at least one of the one or more wireless nodes.

6. The apparatus of claim 3, further comprising:
    at least a second interface configured to obtain at least a second frame indicating a request from at least one of the one or more wireless nodes to change at least one of the assignment or a preferred wake-up time, wherein the processing system is configured to assign or re-assign at least one of the one or more wireless nodes to a TWT group based on the request.

7. The apparatus of claim 1, further comprising:
    at least a second interface configured to obtain at least a second frame comprising an indication of whether or not a wireless node prefers selecting its own TWT group; and
    wherein the processing system is configured to assign that wireless node to a TWT group based, at least in part, on the indication of whether or not that wireless node prefers selecting its own TWT group.

8. The apparatus of claim 1, wherein the at least one second frame comprises at least one of:
    a traffic indication map (TIM) indicating one or more wireless nodes of the TWT group to be serviced or one or more wireless nodes not to be serviced, or
    a discovery frame to be output for transmission between beacon frames, wherein the discovery frame includes at least one of:
        a presence of an element including the indication of the one or more wireless nodes of the TWT group to be serviced;
        an update to the at least one broadcast TWT schedule; or
        at least one of a broadcast TWT identification or group broadcast TWT identification that indicates the one or more wireless nodes of the TWT group to be serviced.

9. The apparatus of claim 1, wherein:
    the at least one second frame comprises a trigger frame of a first format to be output for transmission at a beginning of the broadcast TWT service period; and
    the indication of which nodes of the TWT group are to be serviced comprises one or more association identification (AIDs) included in place of one or more padding fields used in trigger frames of a second format.

10. An apparatus for wireless communications, comprising:
    a processing system configured to generate one or more first frames that, collectively, include a set of parameters defining at least one broadcast target wake-up time (TWT) schedule and an assignment of one or more wireless nodes to one or more TWT groups to be serviced in different TWT service periods (SPs) associated with the at least one broadcast TWT schedule, wherein the processing system is further configured to generate at least one second frame comprising an indication, for each of the TWT SPs, of one or more wireless nodes of a TWT group to be serviced; and a first interface configured to output the one or more first frames for transmission, the first interface being further configured to output the at least one second frame for transmission; and wherein the processing system is further configured to decide to provide the indication of which one or more wireless nodes of the TWT group are to be serviced in a discovery frame based, at least in part, on alignment of discovery frames with broadcast TWT service periods.

11. An apparatus for wireless communications, comprising:

a first interface configured to obtain one or more first frames from a wireless node that, collectively, include a set of parameters defining at least one broadcast target wake-up time (TWT) schedule and an assignment of the apparatus to at least one TWT group to be serviced in TWT service periods (SPs) associated with the at least one broadcast TWT schedule; and a processing system configured to cause the apparatus to exit a first state before or during a TWT SP, based on the broadcast TWT schedule and the assignment, wherein:

the first interface is further configured to obtain, after exiting the first state, at least a second frame comprising an indication of whether or not the apparatus is to be serviced;

each of the at least second frame is a discovery frame when aligned with one of the TWT SPs; and the processing system is further configured to re-enter the first state if the second frame indicates the apparatus is not to be serviced.

12. The apparatus of claim 11, wherein:
the first state comprises a reduced power state with one or more components of the apparatus powered down.

13. The apparatus of claim 11, wherein:
the processing system is further configured to generate at least a second frame indicating a preferred wake-up schedule of the apparatus for use by the wireless node in determining the at least one TWT group;
the apparatus further comprises at least a second interface configured to output the second frame for transmission to the wireless node; and
the processing system is further configured to generate the second frame after obtaining the one or more first frames or during an association procedure performed with the wireless node.

14. The apparatus of claim 13, wherein:
the processing system is further configured to generate at least a third frame indicating a change in a preferred wake-up time.

15. The apparatus of claim 11, wherein:
the processing system is further configured to generate at least a second frame requesting the wireless node to change the assignment of the apparatus or indicating whether or not the apparatus prefers selecting its own TWT group; and
the apparatus further comprises at least a second interface configured to output the second frame for transmission to the wireless node.

16. The apparatus of claim 11, wherein:
the first interface is further configured to obtain one or more frames that re-assign the apparatus to a different TWT group; and
the processing system is further configured to cause the apparatus to exit the first state before or during a TWT SP corresponding to the different TWT group.

17. The apparatus of claim 11, wherein the discovery frame is obtained between beacon frames, and wherein the discovery frame includes at least one of a broadcast TWT identification or group broadcast TWT identification that indicates which members of the at least one TWT group are to be serviced.

18. The apparatus of claim 11, wherein the first interface comprises a receiver configured to receive the one or more first frames and the apparatus is configured as a wireless station.

19. A wireless station, comprising:
a processing system configured to generate one or more first frames that, collectively, include a set of parameters defining at least one broadcast target wake-up time (TWT) schedule and an assignment of one or more wireless nodes to one or more TWT groups to be serviced in different TWT service periods (SPs) associated with the at least one broadcast TWT schedule wherein the processing system is further configured to generate at least one second frame comprising an indication, for each of the TWT SPs, of one or more wireless nodes of a TWT group to be serviced; and
a transmitter configured to transmit the one or more first frames, the transmitter being further configured to output the at least one second frame for transmission; and
a receiver configured to receive at least a third frame from one of the one or more wireless nodes of the TWT group to be serviced, in response to the at least one second frame; and
wherein the processing system is further configured to service wireless nodes from which third frames are received by the wireless station.

* * * * *